US012316053B1

(12) United States Patent
Ruan

(10) Patent No.: US 12,316,053 B1
(45) Date of Patent: May 27, 2025

(54) SOCKET SYSTEM WITH EXTENSION CORD

(71) Applicant: Ningbo Maoli Electric Appliance Co., Ltd., Zhejiang (CN)

(72) Inventor: Lidan Ruan, Zhejiang (CN)

(73) Assignee: Ningbo Maoli Electric Appliance Co., Ltd., Ningbo (CN)

( * ) Notice: Subject to any disclaimer, the term of this patent is extended or adjusted under 35 U.S.C. 154(b) by 0 days.

(21) Appl. No.: 18/961,490

(22) Filed: Nov. 27, 2024

(51) Int. Cl.
*H01R 25/00* (2006.01)

(52) U.S. Cl.
CPC .................................. *H01R 25/003* (2013.01)

(58) Field of Classification Search
None
See application file for complete search history.

(56) References Cited

U.S. PATENT DOCUMENTS 6,767,255 B1 * 7/2004 Croswell ................ H01R 31/02 439/651
6,805,579 B2 * 10/2004 Marchand ............ H01R 25/003 439/502
7,057,108 B1 * 6/2006 Sodemann ......... H01R 13/7135 439/639
7,220,137 B1 5/2007 Liu
7,229,302 B1 * 6/2007 Lai ......................... H01R 27/02 439/502
D592,597 S * 5/2009 van der Lande ......... D13/139.8
9,948,020 B1 * 4/2018 Lin .................... H01R 13/5213
2002/0189848 A1 12/2002 Hawker
2003/0207601 A1 * 11/2003 Adachi ................ H01R 13/443 439/135
2004/0256135 A1 12/2004 Liu
2007/0026728 A1 * 2/2007 Mak ...................... H01R 13/639 439/505
2010/0090851 A1 * 4/2010 Hauser ................. H01R 25/003 340/657
2011/0177704 A1 7/2011 Siu
2012/0028488 A1 * 2/2012 Puschnigg ............. H01R 27/02 439/189

FOREIGN PATENT DOCUMENTS

CN 106129733 A * 11/2016 ............. H01R 13/72

* cited by examiner

*Primary Examiner* — Tho D Ta
(74) *Attorney, Agent, or Firm* — S.J. Intellectual Property LTD.

(57) ABSTRACT

A socket system with extension cord, includes a plurality of connecting blocks capable of being selectively electrically connected to a power supply end and at least one power output end. The plurality of connecting blocks includes a main connecting block, a plurality of side connecting blocks, and at least two cords. A first end of each cord is electrically connected inside the main connecting block, and each cord is provided with at least one side connecting block.

12 Claims, 12 Drawing Sheets

SOCKET SYSTEM WITH EXTENSION CORD

TECHNICAL FIELD

The present disclosure relates to a socket system with extension cord.

BACKGROUND

A socket includes one connecting seat and at least one cord electrically connected thereto, configured for supplying power to an electrical device plugged within. It is an essential and widely used tool in a variety of application scenarios.

SUMMARY

The embodiments of the present disclosure provide a socket system with extension cord, including a plurality of connecting blocks configured to electrically connect to a power supply end and at least one power output end. The plurality of connecting blocks includes: a first connecting main connecting block; and at least two cords. A first end of each of the at least two cords is electrically connected inside the main connecting block, and each of the at least two cords is provided with at least one side connecting block.

The embodiments of the present disclosure provide a socket system with extension cord, including: a first connecting block and at least two cords. A first end of each of the at least two cords is electrically connected inside the first connecting block, a second end of each of the at least two cords is provided with a second connecting block, at least one fourth connecting block is arranged between the first end and the second end of each of the at least two cords.

The embodiments of the present disclosure provide a socket system with extension cord, including: a fifth connecting block and at least two cords. A first end of each of the at least two cords is electrically connected inside the fifth connecting block, a second end of each of the at least two cords is provided with a sixth connecting block. At least one fourth connecting block is arranged between the first end and the second end of each of the at least two cords.

BRIEF DESCRIPTION OF THE DRAWINGS

The description and drawings that constitute a part of the present disclosure are provided for a further understanding of the present disclosure. The illustrative embodiments and their descriptions are provided for explanation but do not constitute improper limitations on the present disclosure.

DETAILED WAY

Figure 1:
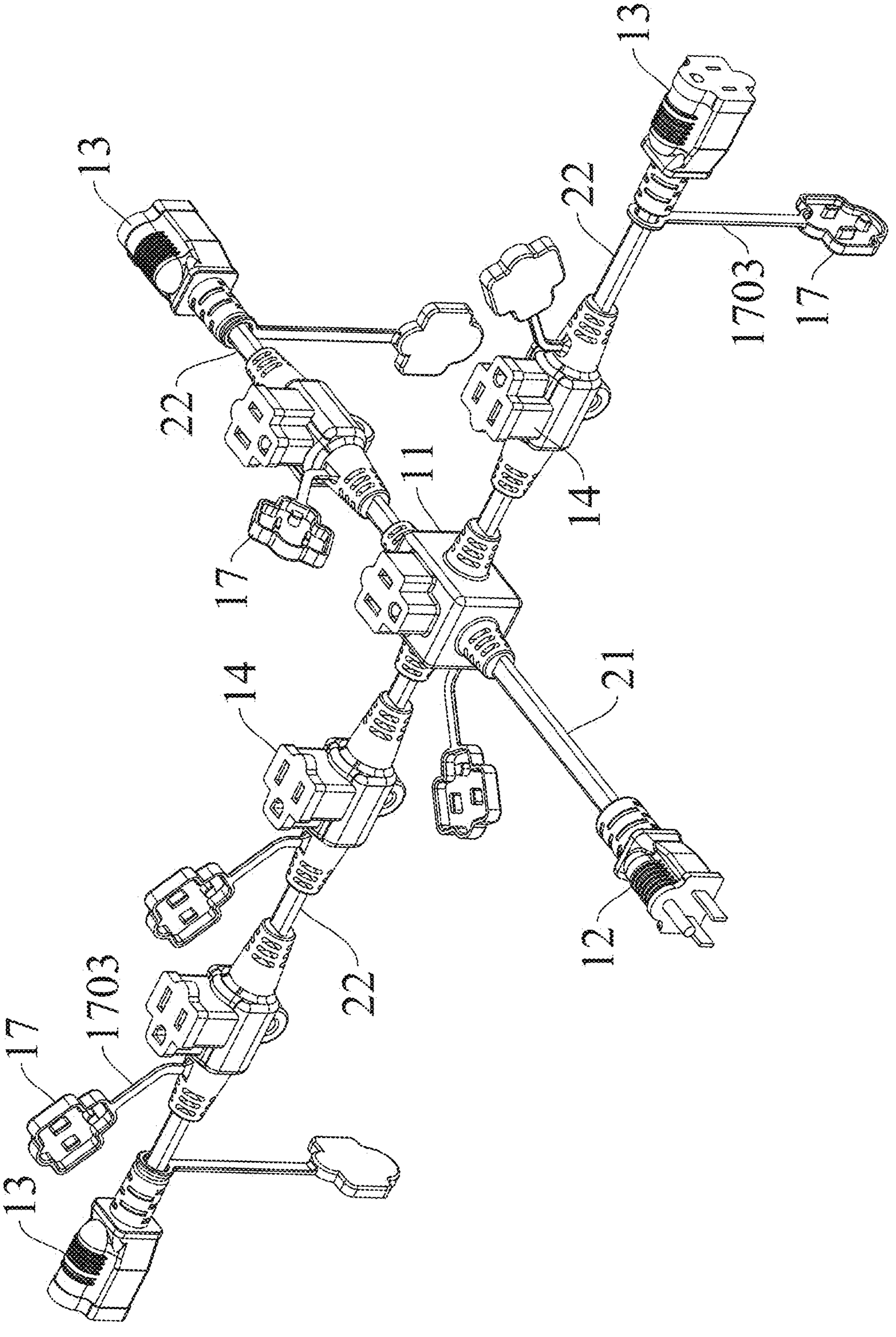
FIG. 1 is a perspective view of a socket system in accordance with the embodiments of the present disclosure.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of one embodiment may be used according to another embodiment to produce yet another embodiment. Therefore, it is intended that the present disclosure includes such modifications and variations within the scope of the appended claims and their equivalents.

In the description of the present disclosure, the terms "longitudinal", "lateral", "upper", "lower", "front", "back", "left", "right", "vertical", "horizontal", "top", "bottom" and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms "connected", "connecting" and "arranged" used in the present disclosure should be understood in a broad sense. For example, it may be a fixed connection or a detachable connection; it may be directly connected or indirectly connected through an intermediate component; it may also be a wired electrical junction, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

According to the embodiments of the present disclosure, a socket system with extension cord is provided, which includes a plurality of connecting blocks. The plurality of connecting blocks includes a main connecting block and a plurality of side connecting blocks. Each of the connecting blocks is provided with a socket or a plug, and one or more of the plurality of connecting blocks is provided with a plug. The plurality of connecting blocks includes a main connecting block, the main connecting block is connected to at least two cords, and at least another two connecting blocks are installed on each cord.

In some embodiments, the main connecting block includes a first connecting block 11 or a fifth connecting block 15. In some embodiments, the side connecting blocks includes at least one second connecting block 12, or at least one third connecting block 13, or at least one fourth connecting block 14, or at least one sixth connecting block 16.

As shown in FIG. 1 to 5, a socket system with extension cord includes a first connecting block 11, and the first connecting block 11 is connected to four cords. A first end of each cord is electrically connected inside the first connecting block 11. The four cords include a first cord 21 and three second cords 22. A second end of the first cord 21 is provided with a second connecting block 12; a second end of each second cord 22 is provided with a third connecting block 13. At least one fourth connecting block 14 is provided between the first end and the second end of each second cord 22. In some embodiments, the first connecting block 11, each third connecting block 13, and each fourth connecting block 14 are all provided with a socket, which is configured to electrically connect to a power supply end. The second connecting block 12 is provided with a plug 1201, which is configured to electrically connect to a power supply end. The first cord 21 is a power supply cord of the socket system, and the second cords 22 are power output cords of the socket system. Therefore, a diameter of the first cord 21 can be selected to be greater than that of each second cord 22, allowing the first cord 21 to carry a higher current. As shown in FIG. 6, in some embodiments, at least one fourth connecting block 14 can also be selected to be provided on the first cord 21.

Figure 2:
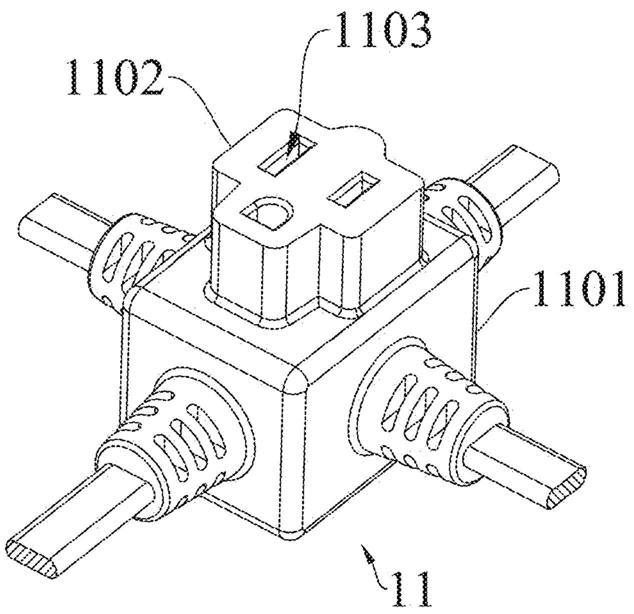
FIG. 2 is a perspective view of a first connecting block in accordance with the embodiments of the present disclosure.

As shown in FIG. 2, in some embodiments, the first connecting block 11 includes a connecting seat 1101. A first end of each of the four cords are electrically connected, and the electrical junction of the first ends of the four cords is encapsulated within the connecting seat 1101, enhancing the waterproofness of the electrical junction and improving the tensile strength between the four cords and the first connecting block 11. The connecting seat 1101 is provided with a socket 1102, and the socket 1102 is provided with a group of plug holes 1103. An electrical connector arranged in the group of plug holes 1103 is electrically connected to the four cords inside the first connecting block 11. In some embodiments, the connecting seat 1101 and the socket 1102 are integrally formed, giving it good waterproofness and tensile resistance.

Figure 3:
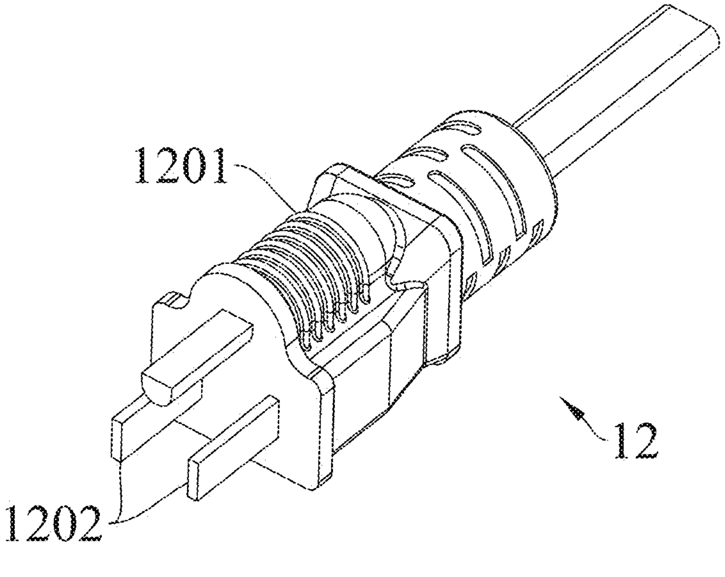
FIG. 3 is a perspective view of a second connecting block in accordance with the embodiments of the present disclosure.
Figure 4:
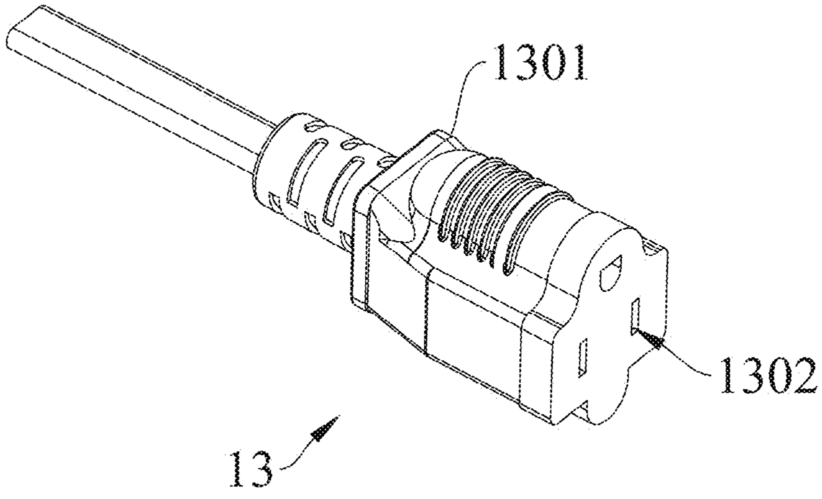
FIG. 4 is a perspective view of a third connecting block in accordance with the embodiments of the present disclosure.

As shown in FIG. 3, in some embodiments, the second connecting block 12 includes a plug 1201, one end of which is provided with a group of pins 1202, and the second end of the first cord 21 is electrically connected to the group of pins 1202 within the plug 1201. As shown in FIG. 4, in some embodiments, each third connecting block 13 includes a socket 1301, one end of the socket 1301 is provided with a group of plug holes 1302. An inner side of the group of plug holes 1302 is provided with an electrical connector, which is configured to electrically connect to the second end of a corresponding second cord 22 inside this socket 1301.

Figure 5:
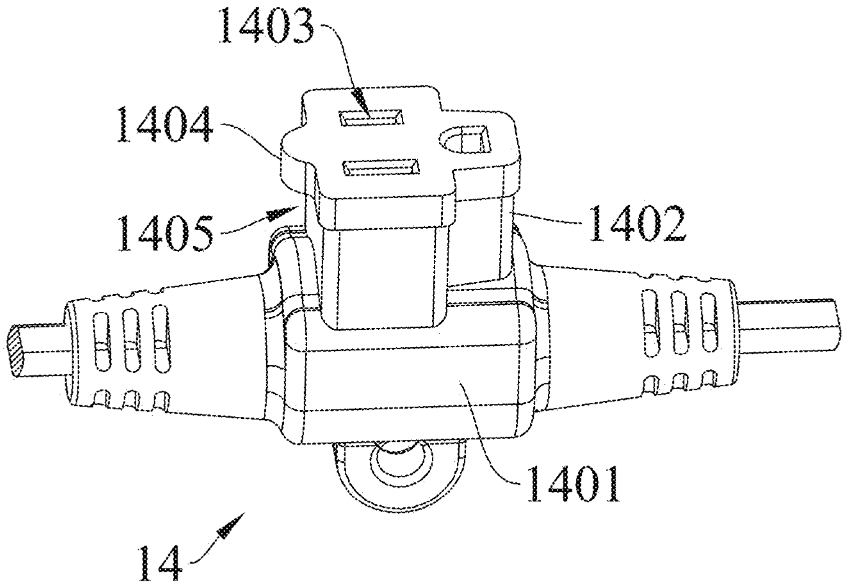
FIG. 5 is a perspective view of a fourth connecting block in accordance with the embodiments of the present disclosure.
Figure 6:
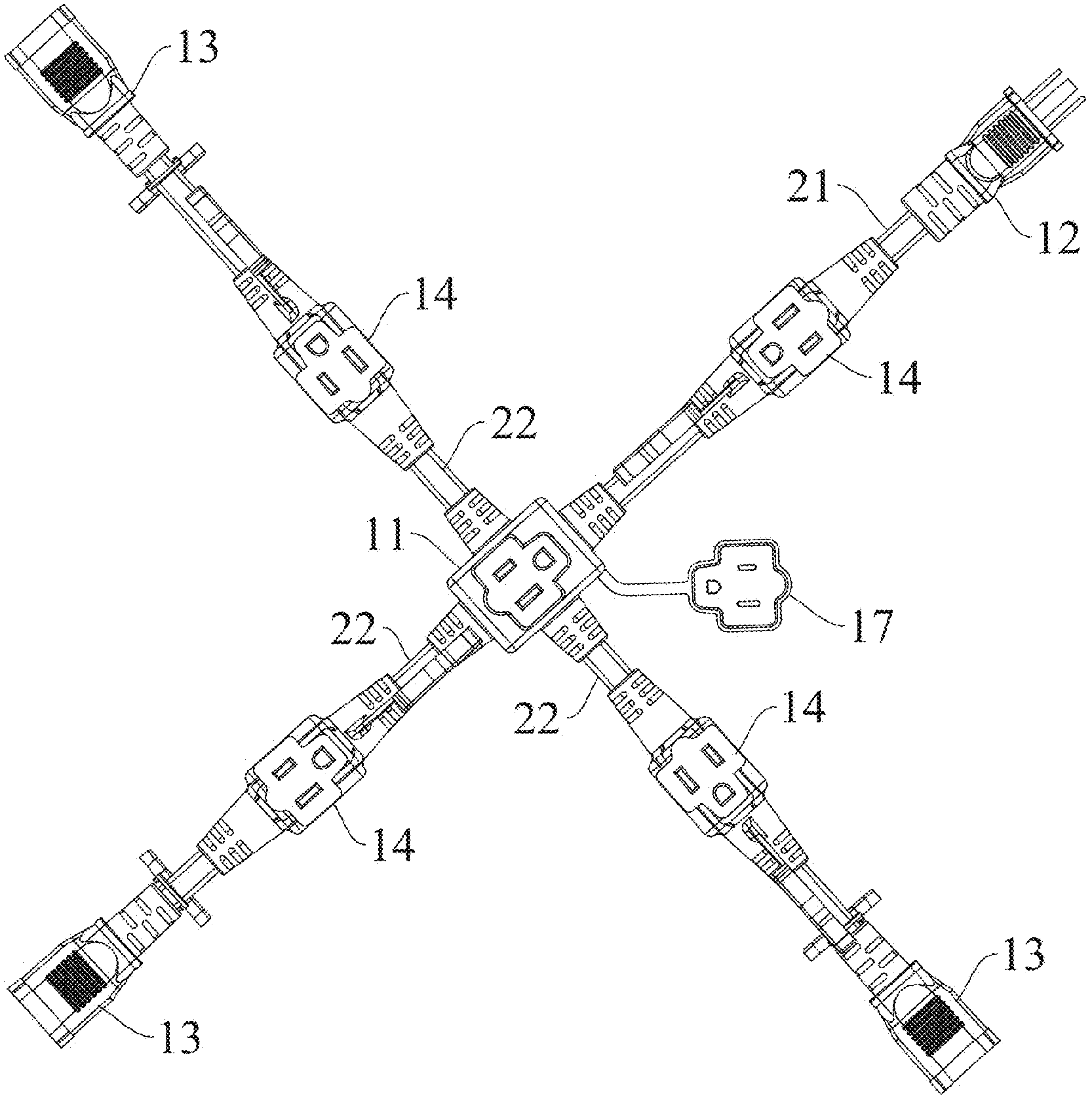
FIG. 6 is a perspective view of a socket system in accordance with the embodiments of the present disclosure.

As shown in FIG. 5, in some embodiments, each fourth connecting block 14 includes a connecting seat 1401, and one second cord 22 passes through a corresponding connecting seat 1401. Each connecting seat 1401 is provided with a socket 1402 defining with a group of plug holes 1403, and an electrical connector inside the plug holes 1403 is configured to electrically connect to a corresponding second cord 22 inside this fourth connecting block 14. In some embodiments, each connecting seat 1401 and its socket 1402 are integrally formed to provide good waterproofness and tensile resistance.

Figure 7:
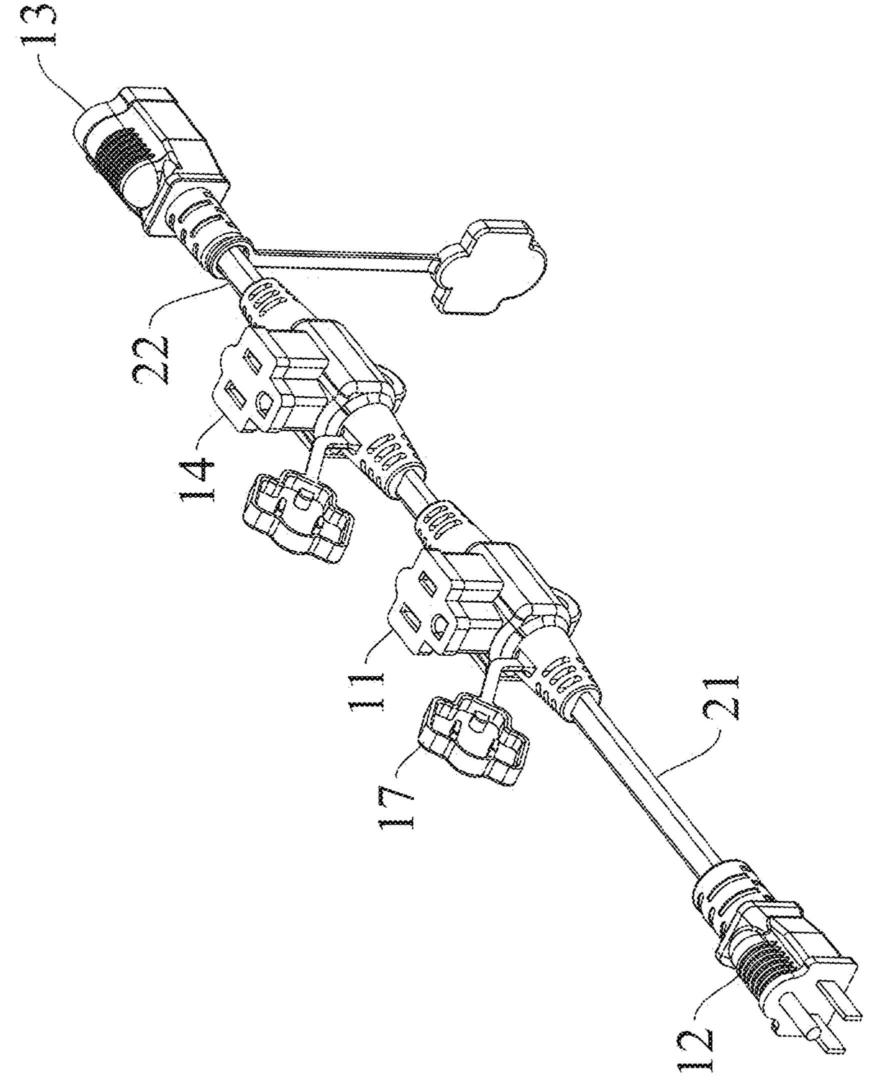
FIG. 7 is a perspective view of a socket system in accordance with the embodiments of the present disclosure.

In the above embodiments, the first connecting block 11 is connected to four cords. In some embodiments, as shown in FIG. 7, the first connecting block 11 is connected to two cords. Alternatively, it can be understood that the first connecting block 11 can selectively be connected to at least two cords. In order to meet different application scenarios, a plurality of fourth connecting blocks 14 can be selectively provided between the first end and the second end of each cord. Alternatively, any cord may not be provided with the fourth connecting block 14.

Figure 8:
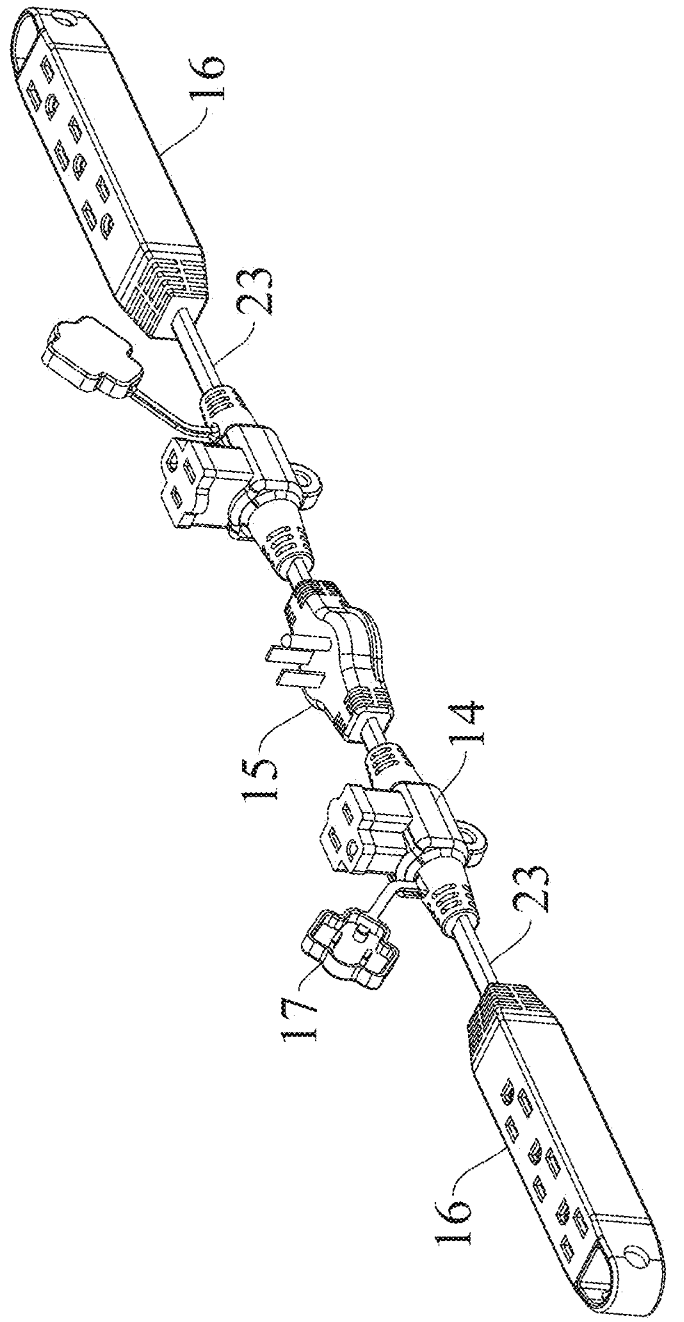
FIG. 8 is a perspective view of a socket system in accordance with the embodiments of the present disclosure.
Figure 9:
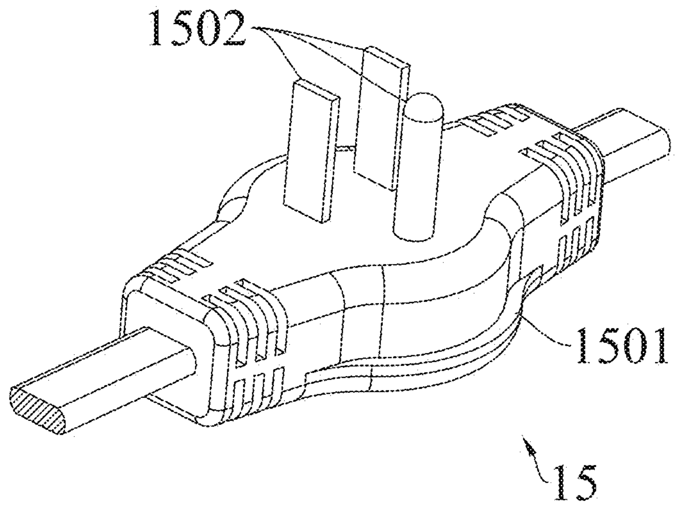
FIG. 9 is a perspective view of a fifth connecting block in accordance with the embodiments of the present disclosure.
Figure 10:
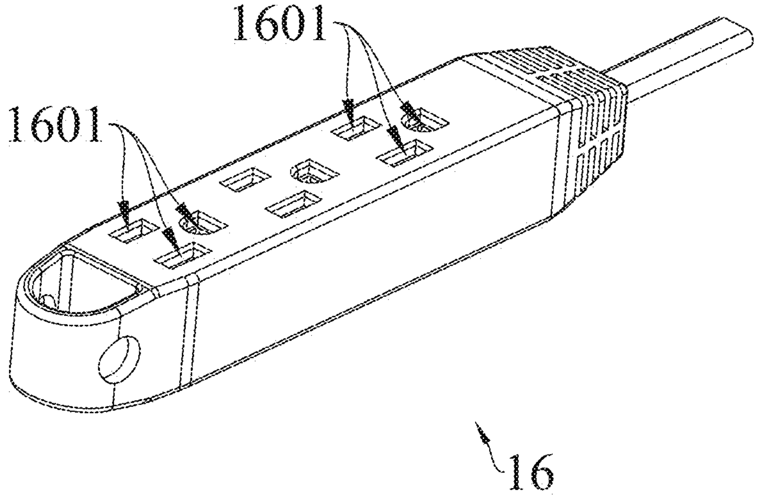
FIG. 10 is a perspective view of a sixth connecting block in accordance with the embodiments of the present disclosure.

As shown in FIG. 8 to FIG. 10, a socket system with extension cord includes a fifth connecting block 15, which is connected to two third cords 23. A first end of each of the two third cords 23 are electrically connected together inside the fifth connecting block 15. At least one fourth connecting block 14 is provided between the first end and the second end of each third cord 23. The second end of each third cord 23 is provided with a sixth connecting block 16. The fifth connecting block 15 includes a plug 1501, which is provided with a group of pins 1502. The group of pins 1502 is electrically connected to the first end of each third cord 23 inside the fifth connecting block 15. In some embodiments, each sixth connecting block 16 includes a connecting seat 1601, which is defined with at least two groups of plug holes 1602, and each group of plug holes 1602 is configured to connect to a power output end. An electrical connector in each group of plug holes 1602 is electrically connected to a corresponding third cord 23 inside the sixth connecting block 16.

Figure 11:
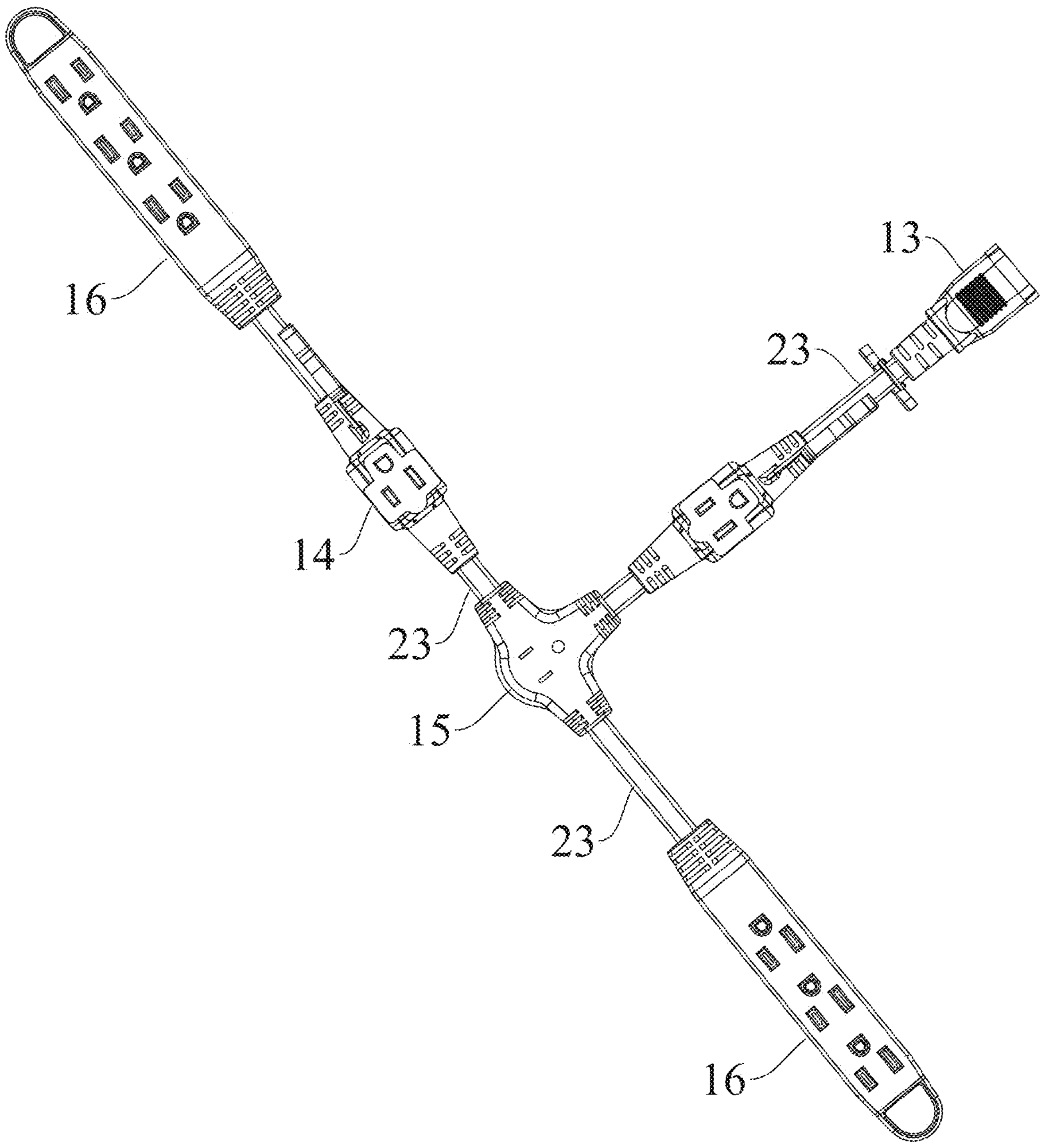
FIG. 11 is a perspective view of a socket system in accordance with the embodiments of the present disclosure.

As shown in FIG. 11, in some embodiments, the fifth connecting block 15 is connected to three third cords 23. Each second end of each of two third cords 23 is provided with a sixth connecting block 16, and the second end of another third cord 23 is provided with a third connecting block 13.

Figure 12:
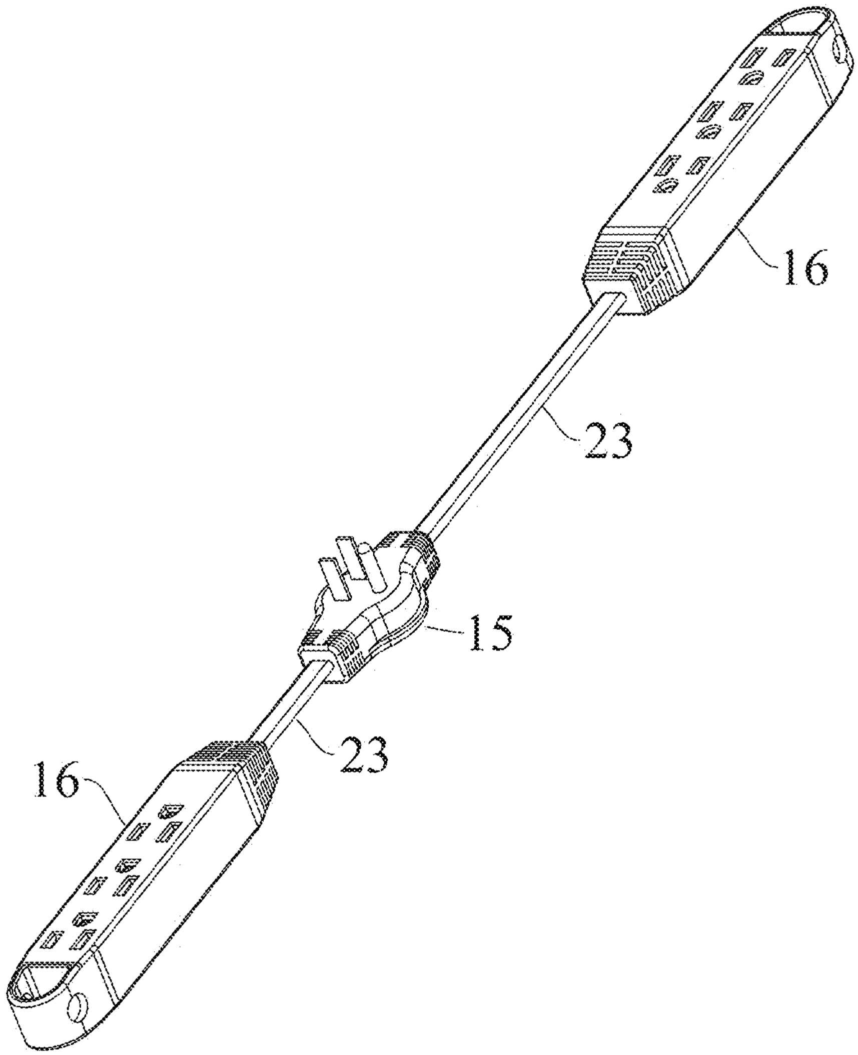
FIG. 12 is a perspective view of a socket system in accordance with the embodiments of the present disclosure.

In some embodiments, the fifth connecting block 15 can selectively connect at least two cords. In order to meet different application scenarios, a plurality of fourth connecting blocks 14 can be selectively provided between the first end and the second end of each cord. In some embodiments, as shown in FIG. 12, any cord may not be provided with the fourth connecting block 14.

As shown in FIG. 1 and FIG. 7, in some embodiments, one or more sockets 1301 can be optionally arranged with a cover 17, and the group of plug holes are arranged at the first end of each socket. Each cover 17 can be optionally snapped on the first end of a corresponding socket and can cover the group of plug holes of this socket, preventing objects from entering this group of plug holes and having a waterproof effect.

Figure 13:
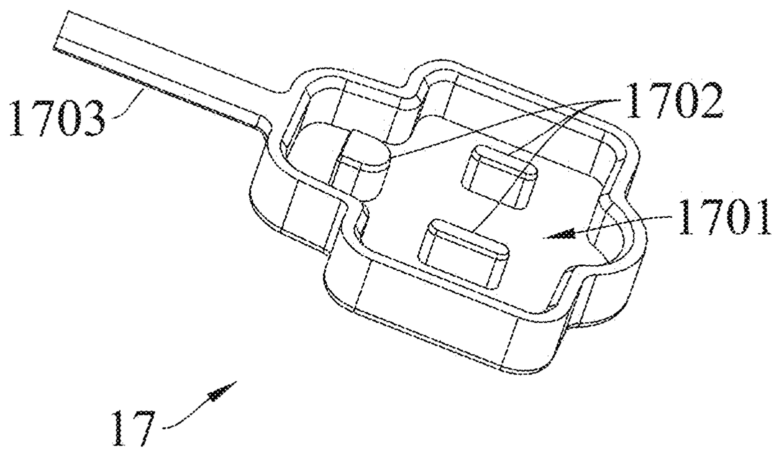
FIG. 13 is a perspective view of a cover in accordance with the embodiments of the present disclosure.
Figure 14:
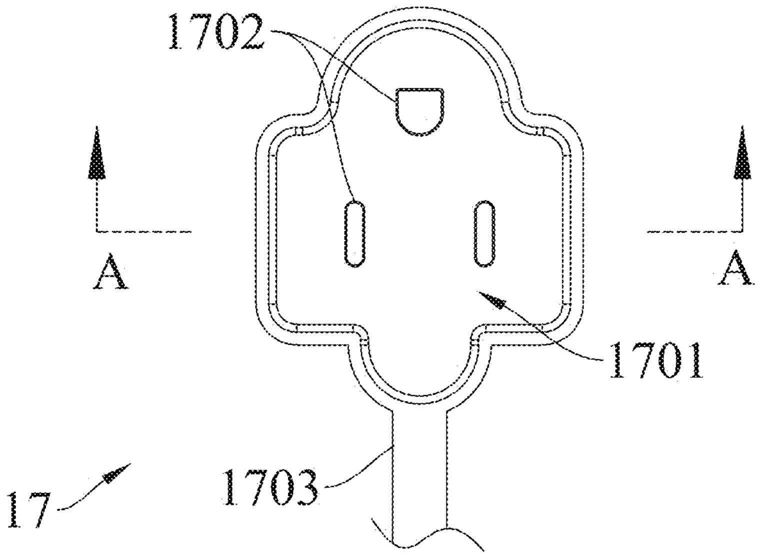
FIG. 14 is another perspective view of the cover in FIG. 13.
Figure 15:
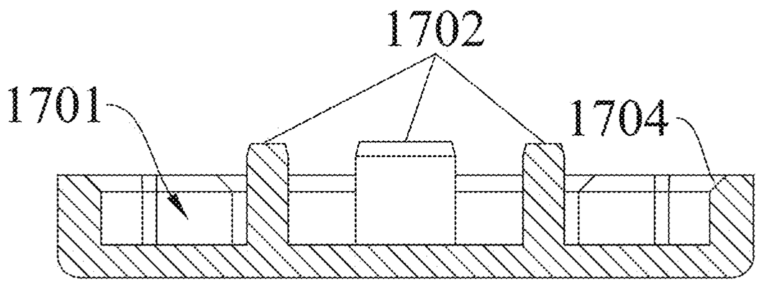
FIG. 15 is a sectional view taken along line AA in FIG. 14.

As shown in FIG. 13 to 15, in some embodiments, each cover 17 is defined with a chamber 1701, and an inner contour of the chamber 1701 of each cover 17 engages with an outer contour of the first end of a corresponding socket, allowing at least a portion of the first end of each socket to be embedded in a corresponding chamber 1701. As shown in FIG. 11, in some embodiments, a bottom of each chamber 1701 is provided with a group of bosses 1702. When one cover 17 is snapped in a corresponding socket, the group of bosses 1702 of this cover is engaged with the group of plug holes of the corresponding socket, improving the waterproof performance of the corresponding socket. In some embodiments, an inner wall of each chamber 1701 is interference-fitted with an outer wall of a corresponding socket, giving it a better waterproof performance.

As shown in FIG. 15, in some embodiments, an edge of the chamber 1701 is defined with a chamfer 1704, facilitating the cover 17 to be snapped on a corresponding socket. As shown in FIG. 13 to FIG. 17, the cover 17 is defined with the chamber 1701 and is provided with the group of bosses 1702 within the chamber 1701, the group of bosses 1702 are configured to be engaged with the at least one group of plug holes.

Figure 16:
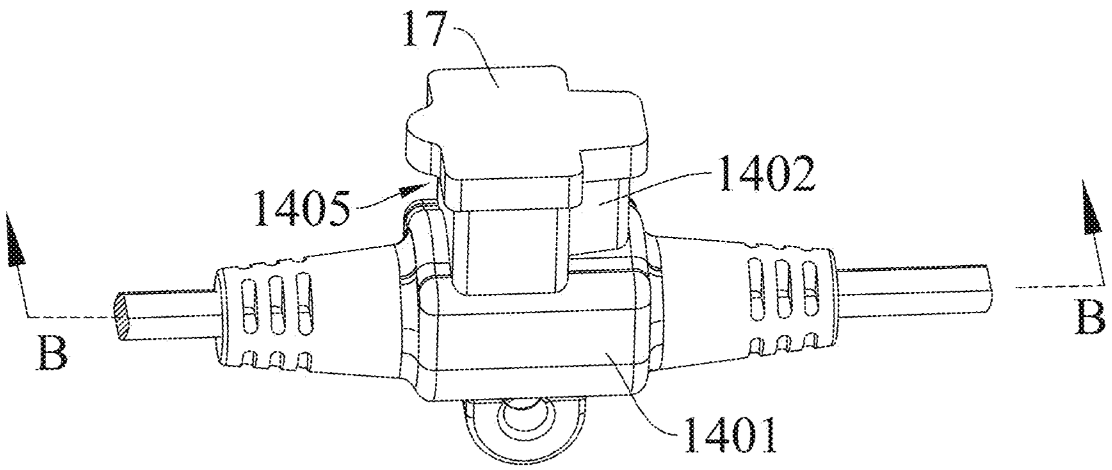
FIG. 16 is a perspective view of a fourth connecting block arranged with a cover in accordance with the embodiments of the present disclosure.
Figure 17:
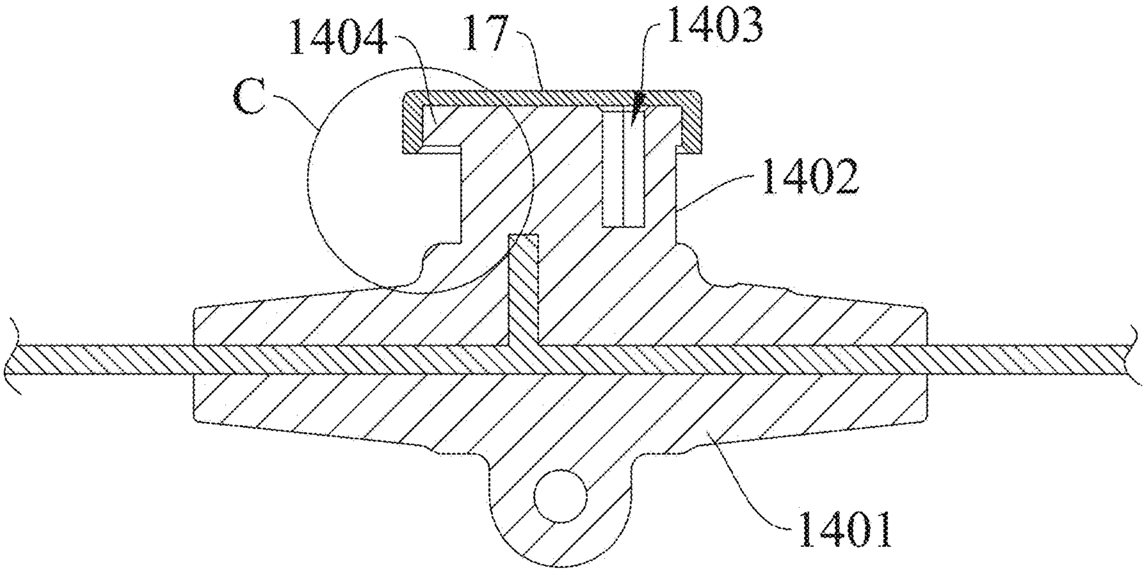
FIG. 17 is a sectional view taken along line BB in FIG. 16.

In some embodiments, as shown in FIG. 5, a first end of each socket 1402 is provided with a protrusion 1404 extending radially outward from a body of the socket 1402, and the protrusion 1404 and a side wall of this socket 1402 form an engaging groove 1405. As shown in FIG. 16 and FIG. 17, one cover 17 is engaged with a corresponding socket 1402, and the protrusion 1404 of this socket 1402 can be embedded in the chamber 1701 of this cover 17. An outer flange of the protrusion 1404 and a side wall of the body form an engaging groove 1405, a height of an outer frame of the cover 17 is greater than a height of the outer flange of the protrusion 1404 to allow the protrusion 1404 to be embedded in the chamber 1701. When opening this cover 17, a user's finger can be extended into the engaging groove 1405, making it easy to contact the edge facing the socket 1402 of this cover 17, thereby opening this cover 17 more easily.

Figure 18:
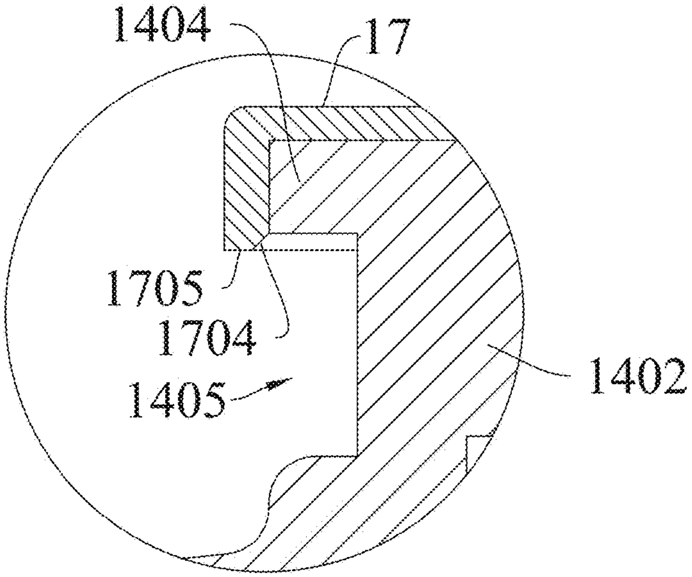
FIG. 18 is a partial enlarged view of area C in FIG. 17.

As shown in FIG. 18, in some embodiments, the protrusion 1404 of one socket 1402 can be completely embedded in the chamber 1701 of a corresponding cover 17. The outer frame of the cover 17 is defined with a convex edge 1705 having the chamfer 1704, and an obtuse angle is formed between the chamfer 1704 and a bottom edge of the outer flange of the protrusion 1404. A user's finger can be inserted into the engaging groove 1405 and abuts against one side, facing the socket 1402, of the convex edge 1705 to open the cover 17.

As shown in FIG. 1 and FIG. 7, in some embodiments, each cover 17 is connected to a corresponding cord or connecting block through a connecting belt 1703. For example, a first end of each connecting belt 1703 is fixedly connected to a corresponding cover 17, and a second end of the connecting belt 1703 is fixedly connected to a corresponding connecting block. Alternatively, the second end of each connecting belt 1703 is sleeved on the outside of a corresponding cord and can move along a longitudinal direction of this cord. The structure of the connecting belt 1703 includes but is not limited to a belt, a chain, and a cord.

The above description is only some embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

What is claimed is:

1. A socket system with extension cord, comprising a plurality of connecting blocks configured to electrically connect to a power supply end and at least one power output end, the plurality of connecting blocks comprising:

a main connecting block; and at least two cords, a first end of each of the at least two cords being electrically connected inside the main connecting block, and each of the at least two cords provided with at least one side connecting block;

wherein at least one of the plurality of connecting blocks comprises a socket, the socket comprises a protrusion extending radially outward from a body of the socket and provided with a cover, the protrusion is defined with at least one group of plug holes, the cover is defined with a chamber and is provided with a group of bosses within the chamber, the group of bosses are configured to be engaged with the at least one group of plug holes, an outer flange of the protrusion and a side wall of the body form an engaging groove, a height of an outer frame of the cover is greater than a height of the outer flange of the protrusion to allow the protrusion to be embedded in the chamber; the outer frame of the cover is defined with a convex edge having a chamfer, and an obtuse angle is formed between the chamfer and a bottom edge of the outer flange of the protrusion.

2. The socket system according to claim 1, wherein the at least two cords comprise a power supply cord and at least one power output cord, the power supply cord is configured to electrically connect the power supply end, and a diameter of the power supply cord is greater than a diameter of the at least one power output cord.

3. The socket system according to claim 1, wherein a second end of each of the at least two cords is provided with a corresponding side connecting block.

4. The socket system according to claim 1, wherein each cover is connected to a corresponding cord or connecting block by means of a connecting strip.

5. The socket system according to claim 1, wherein at least one of the plurality of connecting blocks comprises a plug, and each plug comprises a group of pins.

6. The socket system according to claim 5, wherein one of the at least one side connecting block is provided with a corresponding plug configured to electrically connect to the power supply end.

7. The socket system according to claim 5, wherein the main connecting block is provided with a corresponding plug configured to electrically connected to the power supply end.

8. The socket system according to claim 5, wherein each of the plurality of connecting blocks comprises a connecting seat, and each connecting seat is provided with a corresponding plug or socket.

9. The socket system according to claim 8, wherein each connecting seat and a corresponding plug thereof are integrally formed; or/and each connecting seat and a corresponding socket thereof are integrally formed.

10. The socket system according to claim 8, wherein an electrical junction between the at least two cords, an electrical junction between one of the at least two cords and a corresponding socket, and an electrical junction between one of the at least two cords and a corresponding plug, are encapsulated in a corresponding connecting seat.

11. The socket system according to claim 1, wherein an inner contour of each chamber is capable of engaging with an outer contour of a corresponding socket.

12. The socket system according to claim 11, wherein an inner wall of each chamber is in interference fit with an outer wall of the protrusion of a corresponding socket.

* * * * *